Billings

[11] 4,304,704
[45] Dec. 8, 1981

[54] THERMAL INSULATING MATERIAL

[75] Inventor: Patricia J. Billings, Jackson County, Mo.

[73] Assignee: Stonecote, Inc., Kansas City, Mo.

[21] Appl. No.: 225,663

[22] Filed: Jan. 16, 1981

[51] Int. Cl.$^3$ .................................................. C08K 3/30
[52] U.S. Cl. ........................... 260/29.6 S; 260/42.13
[58] Field of Search ................... 260/29.6 S, 42.13

[56] References Cited

U.S. PATENT DOCUMENTS

| | | | |
|---|---|---|---|
| 2,733,995 | 2/1956 | Robinson | 260/42.13 |
| 3,126,355 | 3/1964 | Birten | 260/29.6 S |
| 3,305,518 | 2/1967 | Jakacki | 260/42.13 |
| 3,617,321 | 11/1971 | Kent | 260/42.13 |
| 3,915,919 | 10/1975 | Nishioka | 260/42.13 |
| 4,011,355 | 3/1977 | Mandish | 260/42.13 |

*Primary Examiner*—Paul R. Michl
*Attorney, Agent, or Firm*—Lowe, Kokjer, Kircher, Wharton & Bowman

[57] ABSTRACT

A thermal insulating material which includes silicone coated perlite providing thermal insulation, powdered perlite to fill in the gaps between the silicone coated perlite particle, and a specially formulated binder for the perlite. The binder has a powder portion comprising a mixture of gypsum and cement for strength and a liquid portion comprising polyvinyl acetate, a colloid and water. After these materials are mixed in proper proportions, water is added to provide the fluidity necessary for application, such as by spraying or molding into prefabricated panels.

10 Claims, No Drawings

THERMAL INSULATING MATERIAL

BACKGROUND OF THE INVENTION

This invention relates to the field of thermal insulation and more particularly to a new material which exhibits greatly improved thermal insulating properties.

The various materials that are presently used widely as thermal insulation all suffer from numerous drawbacks. To provide an effective thermal barrier, it is usually necessary to apply a relatively thick layer of insulation which is undesirable from both a cost standpoint and a space standpoint. The plastic foams that are currently popular give off toxic fumes when exposed to fire or even to high temperatures short of actual fire conditions. Foam insulation shrinks over a period of time and thus forces out trapped air which leads to a reduction in the insulating effect with the passage of time. Glass fiber insulation is hazardous due to the harmful health effects resulting from inhalation of the small glass fibers present in the insulation blanket. Also, glass fiber insulation is difficult to add to existing structures at a practical cost. Existing insulating materials are further characterized by low strength, lack of resistance to weather and moisture, difficulty in handling and an unattractive appearance. Many insulating materials are capable of effective use only with one type of construction material, and their versatility suffers accordingly.

SUMMARY OF THE INVENTION

The present invention is directed to an improved thermal insulating material and has, as its primary goal, the provision of a material which has a significantly increased R value (indicating increased insulating effect) as compared to a similar thickness of conventional insulating materials. Other objects of the invention are to provide a thermal insulating material having a high impact strength, good weatherproofing characteristics, and good adhesive qualities, including the ability to adhere to itself. In the latter respect, the self adhesiveness of the material permits quick and easy repair of damaged areas since the material can simply be sprayed or otherwise applied to the damaged area to fill it in. It is a particularly important feature of the invention that the material can either be applied in the field in liquid form, as by spraying, or molded or otherwise formed into prefabricated panels that can be applied by conventional techniques.

In accordance with a preferred form of the invention, a specially formulated binder is added to silicone coated perlite and powdered perlite. The resultant material can then be mixed with water to provide the necessary fluidity and can be field applied to walls or poured or pumped into molds to form prefabricated panels. The binder has a powder portion and a liquid portion. The powder includes a mixture of gypsum and cement. The liquid portion of the binder includes polyvinyl acetate and a colloid which inhibits bubbling and frothing of the polyvinyl acetate when it is mixed with water. While this binder is tough and has good insulating properties of its own, its primary function is to hold the silicone coated perlite particles close together. The powdered perlite fills in the gaps between the aggregate particles to provide a particularly effective thermal barrier.

DETAILED DESCRIPTION OF THE INVENTION

The present invention provides an improved thermal insulating material which includes silicone coated perlite particles in aggregate form for insulation purposes, powdered perlite to fill in gaps between the silicone coated perlite particles, and a specially formulated binder for the perlite. The binder includes a powder portion comprising gypsum and cement and a liquid portion comprising polyvinyl acetate mixed with water and a colloid to inhibit frothing of the polyvinyl acetate. Water is mixed with the material to give it the fluidity necessary for application.

In a preferred form of the invention, the gypsum and cement are mixed together to provide a cementitious mixture which gives the insulating material a high impact strength. The cementitious mixture preferably includes, by volume, one part of a high density gypsum composition available from U.S. Gypsum Company under the trade designation "Hydrostone", one part of a gypsum composition available from U.S. Gypsum Company under the trade designation "Hydrocal white", and three parts of a cement which is a fast setting cement commercially available under the trade designation "Duracal". Thus, the cement mixture is about 40% gypsum and about 60% cement on a volume basis. Other types of gypsum can be used, but the high density "Hydrostone" and "Hydrocal white" compositions are preferred due to their high strength. "Duracal" cement is likewise preferred in most circumstances due to its strength and fast setting properties, although other types of cements are acceptable and may even be more desirable in some situations.

The liquid portion of the binder is a polyvinyl acetate mix which includes polyvinyl acetate, a colloid and water. Each gallon of pva mix includes about 60 ounces of polyvinyl acetate, about 5 ounces of colloid and about 63 ounces of water, giving the mix a content of about 47% polyvinyl acetate, about 4% colloid and about 49% water by volume. The purpose of the colloid is to prevent or inhibit the polyvinyl acetate from bubbling or frothing, and the aforesaid ratio of 12 to 1 (polyvinyl acetate to colloid) has been found to be most advantageous under normal circumstances. The colloid can be of any suitable type suitable to inhibit frothing of the polyvinyl acetate.

The binder serves to hold the silicone coated perlite particles close together in order to make the material effective as thermal insulation. At the same time, the binder assures that the powdered perlite is bound in place in the gaps between the silicone coated perlite particles, thus assuring a good thermal barrier. The cementitious mixture and the polyvinyl acetate mix described above carry out these functions in a particularly effective manner. Additionally, the pva mix is a tough and strong substance which enhances the overall strength of the material, and it exhibits good thermal insulation properties itself. The polyvinyl acetate is also a good weatherproofing agent which further increases its desirability for use in the binder for the perlite, as does its compatibility with gypsum and cement in connection with providing impact strength and toughness to the final product.

The primary insulating effect is provided by the perlite. Since water is readily absorbed by perlite, silicone coated perlite particles should be used to provide a moisture resistant coating which repels water. Silicone coated perlite aggregate is commercially available and is preferred, although other coatings can be employed to shield or protect the perlite particles from water absorption. Silicone coated perlite in aggregate form having a density of about 3 pounds per cubic foot has been found to be effective. However, it should be understood that expanded ores other than perlite can also be utilized.

The powdered perlite serves to fill in the gaps which are inevitably present between the silicone coated perlite particles. If these gaps are not filled, the effectiveness of the insulating material is significantly impaired, as heat can readily leak through the gaps. As will be explained more fully, it has been found that about one part of powdered perlite for each ten parts of silicone coated perlite (on a volume basis) is sufficient in most cases to effectively fill in the gaps between the perlite particles. Again, an expanded ore other than perlite can be used in many instances.

The insulating material is mixed by mixing, on a volume basis, about two parts of the gypsum and cement mix (which includes about 40% gypsum and about 60% cement) with one part of the liquid portion of the binder (which includes about 47% polyvinyl acetate, 4% colloid and 49% water), ten parts of the silicone coated perlite, one part of the powdered perlite and one part water. Thus, each 15 cubic feet of material includes two cubic feet of the gypsum and cement mix, one cubic foot of pva mix, ten cubic feet of silicone coated perlite, one cubic foot of powdered perlite and one cubic foot of water. This results in a volume percentage of approximately 13% gypsum and cement, 7% pva mix, 66% silicone coated perlite, 7% powdered perlite and 7% water in the final product.

The water which is mixed in with the other materials is merely to give the material sufficient fluidity to be sprayed or otherwise applied in the field or pumped or poured into molds in a plant. It should be understood that the material is normally provided without the water and that the water is only mixed immediately prior to application of the material. The water volume can vary rather significantly without having an appreciable effect on the performance of the material. When the material is mixed, air is permanently trapped in it, thus adding to the insulating effect. Unlike foam insulation, the air is permanently trapped and the effectiveness of the insulation does not deteriorate with the passage of time.

As previously indicated, the insulating material can be applied in liquid form in the field or prefabricated into panels. For field application, it is contemplated that the material will be sprayed directly onto a wall or another surface by conventional spray equipment such as an airless sprayer. The material readily adheres to cement, brick, wood, steel and virtually any other building material. A uniform coating of the desired thickness, depending upon the insulating requirements, can thus be applied, and the material sets up in a relatively short time, depending upon the proportion of its constituent materials and primarily the cementitious mix. For example, the material can be mixed to set up in 30 minutes or so in some cases and in several hours in other cases. When panels of insulation are prefabricated by pumping or pouring the mixture into molds and letting it set, the finished panels can be installed in any desired manner such as with conventional fasteners or adhesives.

The principal advantage of the material described above is that it is significantly more effective as thermal insulation than existing insulating materials. Also, it has a high impact strength and is fireproof and resistant to weathering. Unlike some existing insulating materials, the material of this invention can be easily applied to existing buildings and other structures as well as to newly constructed buildings. The exposed surface of the insulating material is smooth and can serve as a finished surface. It can also be painted, panelled, wallpapered or textured in conventional fashion, and trim, molding, and other accessory items can be installed. Conventional adhesives readily adhere to the surface of the material and, as indicated previously, the material adheres to all common building materials when sprayed or otherwise applied in liquid form. It is also significant to note that the material adheres readily to itself. Thus, if a portion of the insulating material breaks away or is otherwise damaged, additional material can simply be sprayed onto the damaged area to effectively repair it.

Having thus described the invention, I claim:

1. A thermal insulating material adapted to be mixed with water for application in a fluid state prior to setting, said material comprising an expanded ore in aggregate form with the aggregate particles coated with a moisture resistant substance, an expanded ore in powdered form, and a binder for the expanded ores, said binder comprising gypsum, cement, polyvinyl acetate and a colloid for inhibiting frothing of the polyvinyl acetate.

2. A material as set forth in claim 1, wherein said binder further comprises water.

3. A material as set forth in claim 2, wherein:
said binder has a powder portion comprising gypsum and cement present in said powder portion in a volume percentage of approximately 40% and approximately 60%, respectively; and
said binder has a liquid portion comprising polyvinyl acetate, colloid and water present in said liquid portion in a volume percentage of approximately 47%, approximately 4% and approximately 49%, respectively.

4. A material as set forth in claim 1, wherein the expanded ore in aggregate form is perlite and the expanded ore in powdered form is powdered perlite, said moisture resistant substance comprising silicone coating the perlite particles in the aggregate.

5. A composition which upon mixing with water and subsequent setting provides a thermal insulating material, comprising:
(a) silicone coated perlite;
(b) powdered perlite; and
(c) a binder for the perlite, said binder having a powder portion comprising a mixture of gypsum and cement and a liquid portion comprising polyvinyl acetate, water and a colloid for inhibiting frothing of the polyvinyl acetate.

6. The invention set forth in claim 5, wherein gypsum is present in said mixture in a volume percentage of approximately 40% and cement is present in said mixture in a volume percentage of approximately 60%.

7. The invention set forth in claim 5, wherein the volume ratio of the silicone coated perlite to the powdered perlite to the powder portion of the binder to the liquid portion of the binder is approximately 10 to 1 to 2 to 1.

8. The invention set forth in claim 7, wherein:
gypsum is present in said mixture in a volume percentage of approximately 40%;

cement is present in said mixture in a volume percentage of approximately 60%; and
the volume ratio of polyvinyl acetate to colloid in said liquid portion of the binder is approximately 12 to 1.

9. A thermal insulation material adapted to be applied in a liquid state and to subsequently set to a solid state, said material comprising silicone coated perlite present in a volume percentage of approximately 66%, powdered perlite present in a volume percentage of approximately 7%, a mixture of gypsum and cement forming a powder binder for the perlite present in a volume percentage of approximately 13%, a liquid binder for the perlite present in a volume percentage of approximately 7%, and water present in a volume percentage of approximately 7%.

10. A thermal insulation material as set forth in claim 9, wherein said liquid binder comprises polyvinyl acetate, water and a colloid for inhibiting frothing of the polyvinyl acetate.

* * * * *